United States Patent [19]

Lapeyre

[11] 4,138,011
[45] Feb. 6, 1979

[54] NON-PIVOTAL MODULAR CONVEYOR BELT AND MODULAR LINKS THEREFOR

[75] Inventor: James M. Lapeyre, New Orleans, La.

[73] Assignee: The Laitram Corporation, New Orleans, La.

[21] Appl. No.: 847,790

[22] Filed: Nov. 2, 1977

Related U.S. Application Data

[63] Continuation of Ser. No. 681,031, Apr. 28, 1976, abandoned.

[51] Int. Cl.$^2$ .............................................. B65G 15/22
[52] U.S. Cl. .................................. 198/844; 74/231 J; 198/842
[58] Field of Search ............... 198/844, 850, 851, 852, 198/853, 792, 842; 74/231 J, 231 P, 243 C, 243 FC, 245 C, 245 LP, 245 P, 251 R, 251 C

[56] References Cited

U.S. PATENT DOCUMENTS

| | | | |
|---|---|---|---|
| 2,488,872 | 11/1949 | Mathieu | 198/847 |
| 2,733,181 | 1/1956 | Riedesel | 74/231 J |
| 2,751,065 | 6/1956 | Thomson | 74/231 J |
| 3,262,549 | 7/1966 | Stewart et al. | 198/844 |
| 3,602,364 | 8/1971 | Maglio et al. | 198/853 |
| 3,728,066 | 4/1973 | Stadler et al. | 74/231 J |
| 3,774,752 | 11/1973 | Harvey | 198/852 |
| 3,870,141 | 3/1975 | Lapeyre et al. | 198/853 |
| 3,876,089 | 4/1975 | Moser | 198/844 |
| 3,915,025 | 10/1975 | Poerink | 198/850 |
| 3,921,792 | 11/1975 | Anderson et al. | 198/851 |

FOREIGN PATENT DOCUMENTS

541693  12/1941  United Kingdom ...................... 198/834

Primary Examiner—Robert W. Saifer
Assistant Examiner—Richard K. Thomson
Attorney, Agent, or Firm—Wilkinson, Mawhinney & Thiebault

[57] ABSTRACT

The present disclosure is directed to a non-pivotal modular conveyor belt and modular links therefor wherein a belt is made up of modules interfitted and joined by a non-pivotal connection passing laterally through adjacent interfit modules at their ends and wherein the module has a flexible member joining a pair of link ends. When assembled with the non-pivotal connection through the interlocked link ends with the adjacent flexible members in abutting relationship the point of abutment of the flexible members may be fused so that there is no open joint into which foreign matter may enter requiring cleaning.

2 Claims, 12 Drawing Figures

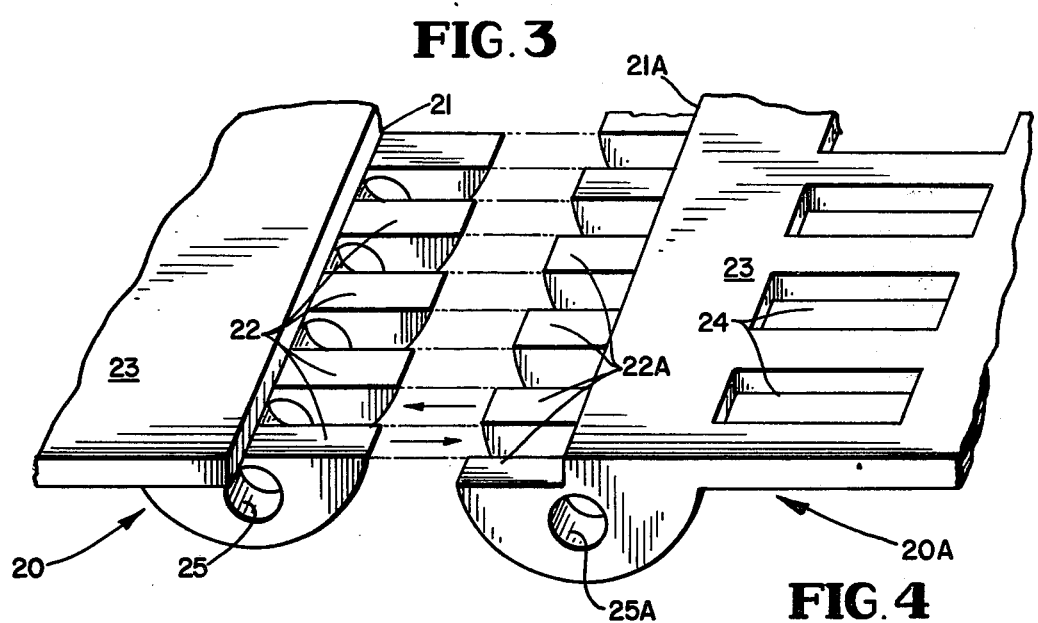
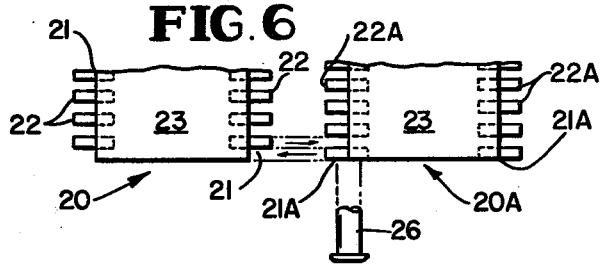
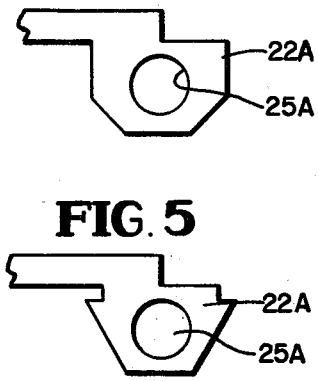
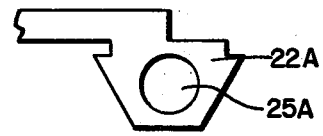
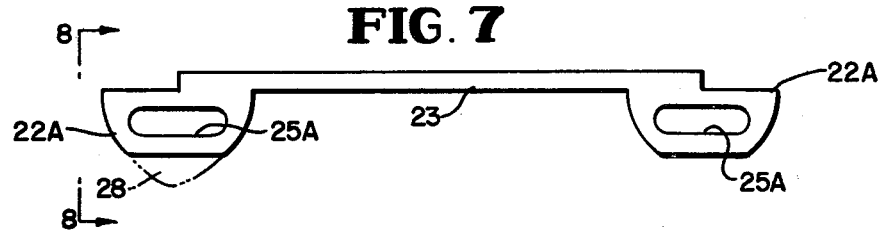
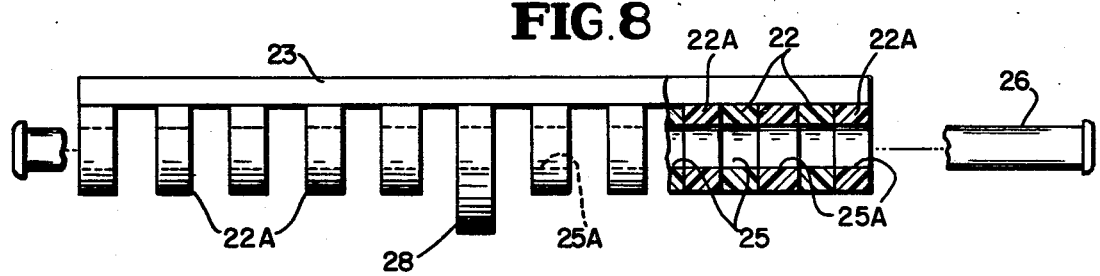

FIG. 9
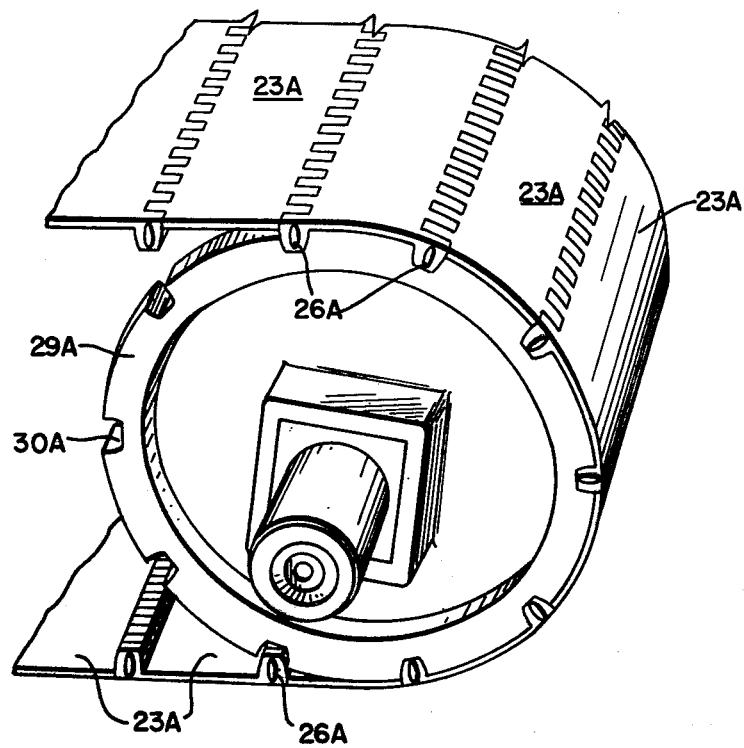
FIG. 10
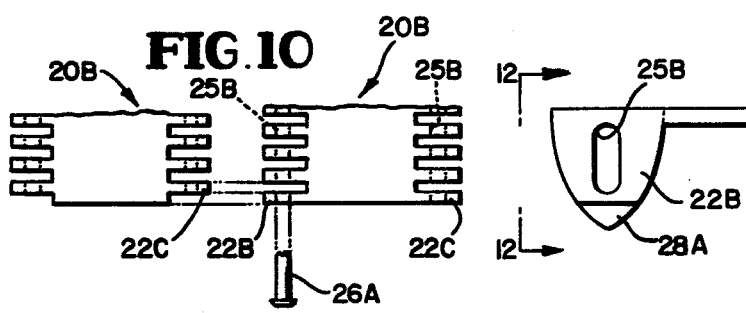
FIG. 11
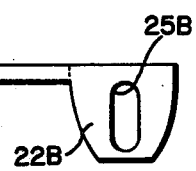
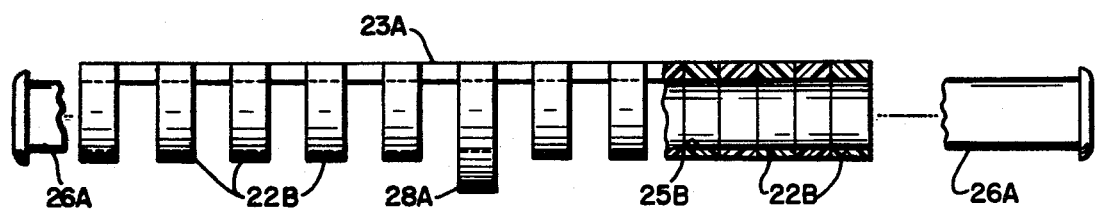
FIG. 12

NON-PIVOTAL MODULAR CONVEYOR BELT AND MODULAR LINKS THEREFOR

This application is a continuation of my similarly entitled application Ser. No. 681,031, filed Apr. 28, 1976 now abandoned.

An object of the present invention is to provide a new and improved modular and flexible plastic conveyor belt and modules therefor. For reference see my U.S. Pat. No. 3,724,285, granted Apr. 3, 1973. In the present invention the modules are joined with a non-pivotal connection and the top of the joint may be sealed against entry of foreign matter.

Another object of the present invention is the provision of a driving tooth for sprocket engagement extending from at least one link end member of each module.

A further object of the present invention is the provision of a tracking means within the width of the belt to maintain belt alignment with driving sprockets over which the belt made up of non-pivotal joined adjacent modules is driven.

A still further object of the present invention is the provision of a belt made up of modules joined end to end in an interfitting relationship by a non-pivotal connection so that a flexible member between each link end of a module are in abutting adjacent relation and may be fused along their line of abutment and the link ends of adjacent modules slidably engage beneath the underside of the flexible members.

With the foregoing and other objects in view the invention will be more fully described hereinafter and more particularly pointed out in the appended claims.

In the drawings in which like parts are denoted by reference characters throughout the several views:

FIG. 3 is a fragmentary perspective view of a pair of modules having their link ends about to be interfit to bring the flexible members into abutting relationship.

FIGS. 4 and 5 are fragmentary side elevational views of different forms of module link ends.

FIG. 6 is a fragmentary top plan view of two modules about to be interfit and connected.

FIG. 7 is a side elevational view of one form of module in accordance with the present invention showing a non-circular hole to receive a non-circular rod for he non-pivotal link end connection.

FIG. 8 is a part elevation and part vertical section through a module taken on the lines 8—8 in FIG. 7.

FIG. 9 is a fragmentary perspective view of a belt made up of modules of a different form from FIG. 3 wrapped about a sprocket and drive shaft.

FIG. 10 is a fragmentary top plan view of a pair of adjacent modules about to be interfit employing the form of module shown in FIG. 11.

FIG. 11 is a side elevational view of the form of module employed to make up the belt of FIG. 9.

FIG. 12 is a partial elevation and partial vertical section taken along the lines 12—12 in FIG. 11.

Figure 1:
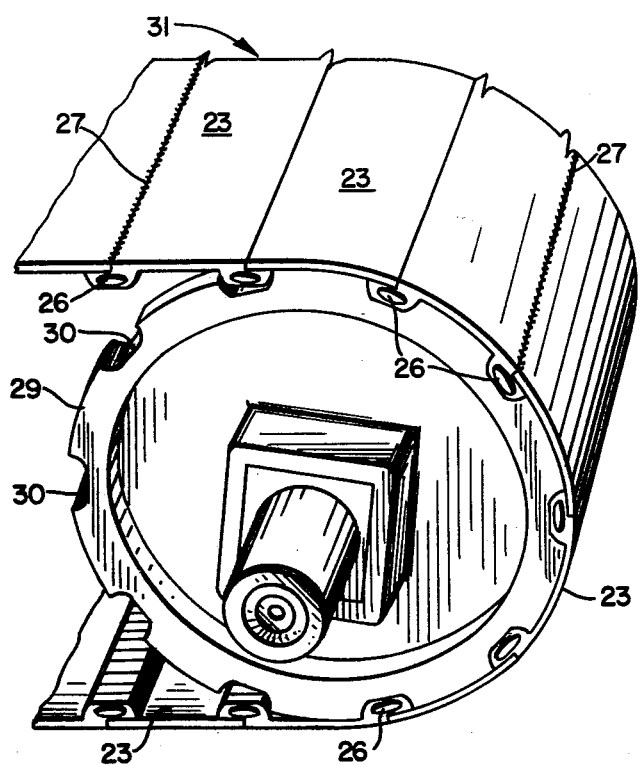
FIG. 1 is a fragmentary perspective view of a belt made up of modules in accordance with the present invention in assembled form with adjacent abutting flexible members fused with the belt passing over a sprocket and drive shaft.

Referring now to the drawings and for the moment to FIGS. 3 through 8, 20 and 20A represent two modules having ends 21 and 21A with a plurality of substantially identical link ends 22 and 22A spaced apart to permit insertion of the link ends 22 and 22A in interfit lateral engagement. The link ends are joined to a flexible member 23 which may be either solid as shown in module 20 or perforate at 24 as shown in module 20A. The module ends 21, 21A have openings 25, 25A which when nested or interlocked are aligned on the axis of both module openings to receive a connector rod 26 extending laterally through the width of the module.

When the modules 20 and 20A are interlocked and the pins 26 passed through the openings 25, the link ends 22 and 22A have passed beneath and bear against the underside of the flexible member 23 and the two adjacent modules flexible members 23 are in abutting relationship, as best seen in FIG. 1. Even though the openings 25, 25A as shown in FIGS. 3 through 6 are circular, as is rod 26, adjacently joined modules will not pivot about the rod 26 because of the link ends 22, 22A bearing against the underside of the flexible member 23 of the adjacent module. Optional fusing of adjacent abutting flexible members along the line 27 by the application of heat also assures against relative pivotal motion between two adjacently linked modules.

The modules may be injection molded of any suitable plastic, such as acetal, polypropylene or polyethlene, which will permit the thin tensile member 23 to flex about the sprocket contour as it is driven about same.

On each end of a modules at least one of the link ends 22, 22A will have a protruding end 28 as a driving tooth for engagement with a sprocket 29 in both a driving and a positive tracking because depressions 30 accommodate the long teeth in between the short teeth in the sprocket.

The openings 25A in the link ends 22A as best seen in FIG. 7 are not circular and further resist any pivotal acting between adjacent modules when passing about a sprocket.

Referring now to FIGS. 10 through 12, the module shown in FIG. 11 has a pair of link ends 22B joined by a flexible member 23A. A vertically elongated opening 25B replaces the circular openings 25 and 25A and the connecting rod 26A is of complimentary geometric form to provide a non-pivotal connection between two adjacently connected modules.

FIG. 10 shows two adjacent modules 20B and 20C each having link ends 22B and 22C with openings 25B therethrough about to be interengaged and a locking pin 26A passed through the aligned openings 25B. As shown in FIG. 12 at least one of the plurality of link ends 22B has a protruding end 28A as an aligning as well as driving tooth for engagement with a sprocket 29A, in FIG. 9.

In each embodiment the link ends are vertically thicker than the thin intermediate tensil member 23 to provide a substantial connecting area through which the connecting pin 26 is passed as well as to provide a mass forming the teeth 28 which are driven by the sprocket which drives the conveyor belt as shown in FIGS. 9 through 12 inclusive.

Figure 2:
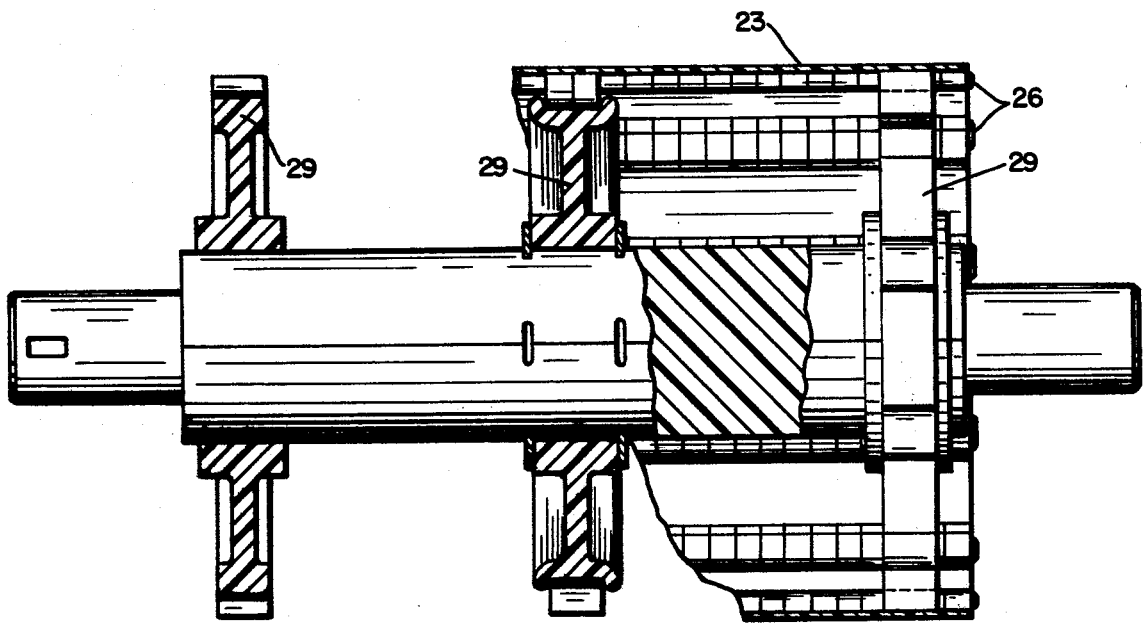
FIG. 2 is a vertical section with parts broken away showing the driving relationship between the sprockets and the modular belt.

A conveyor belt or transmission drive belt 31 is made into an endless belt by interconnecting the modules shown in FIGS. 3, 6 and 10 with connecting rods 26, 26A. In the form of the invention shown in FIGS. 1 and 2 the assembled belt 31 may be fused at 27 along the line of abutment of adjacent flexible members. This embodiment has particular utility in conveying food because crevices etc. are minimized.

The belt 31 may be constructed with all joints 27 fused or heat welded in applications where absolute elimination of the crevices between adjacent modules is required; however, all joints 27 should not be fused in general applications of the belt to industrial uses to permit of field installation, repair, lengthening or shortening and disconnection for repair.

Due to the flexibility of each module a belt 31 made up of modules as shown in FIG. 9 makes an excellent transmission drive belt between a prime mover and a driven mechanism.

What I claim is:

1. For use in making up a conveyor belt, a module comprising:
   a. a first plurality of joinable ends of substantially identical width, each being formed to surround a non-pivotal opening, said openings of said first plurality being aligned on the axis of said openings,
   b. a second like plurality of joinable ends of substantially identical width, each being formed to surround a non-pivotal opening, said openings of said second plurality being arranged coaxially and parallel to said first plurality of openings,
   c. a relatively thin bendable member homogeneously formed with and joining said joinable ends of said first and second pluralities,
   d. said joinable ends being vertically thicker than said thin bendable member and being dimensioned and spaced apart by a distance slightly greater than said width so that a plurality of said modules may be engaged with each other at said ends,
   e. said joinable ends having upper surfaces which are co-planar with the bottom surface of said bendable member,
   f. said upper surfaces adapted to slidably fit beneath and engage the bottom surface of the mating bendable member when said module is joined to a like module in making up a conveyor belt.

2. A belt comprising in combination:
   a. a plurality of like modules, each of said modules including a first plurality of joinable ends of like width, a second plurality of joinable ends each of said like width, and an intermediate relatively thin section integrally formed with and joining said first and second pluralities of joinable ends,
   b. said joinable ends of each said modules being vertically thicker than said intermediate relatively thin section and releasably engaged between ends of an adjacent module except for individual joinable ends disposed at the extreme sides of said belt, and
   c. means connecting said modules at engaged joinable ends in non-pivotal joints,
   d. said joinable ends having upper surfaces which are co-planar with the bottom surface of said bendable member,
   e. said upper surfaces adapted to slidably fit beneath and engage the bottom surface of the mating bendable member when said module is joined to a like module in making up a conveyor belt.

* * * * *